(12) United States Patent
Ho (10) Patent No.: US 8,693,178 B2
(45) Date of Patent: Apr. 8, 2014

(54) INPUT DEVICE FIXING STRUCTURE

(76) Inventor: Li Yin Ho, Taipei (TW)

(*) Notice: Subject to any disclaimer, the term of this patent is extended or adjusted under 35 U.S.C. 154(b) by 121 days.

(21) Appl. No.: 13/186,425

(22) Filed: Jul. 19, 2011

(65) Prior Publication Data

US 2012/0050972 A1 Mar. 1, 2012

(30) Foreign Application Priority Data

Aug. 25, 2010 (TW) ................................ 99216402 U (51) Int. Cl.
*G06F 1/16* (2006.01)
*B41J 11/56* (2006.01)

(52) U.S. Cl.
USPC ...................................... 361/679.17; 400/682

(58) Field of Classification Search
USPC .................... 361/679, 679.08–679.2, 679.02; 400/682, 82, 691–693, 488, 489; 341/22; 345/168; 364/708.1
See application file for complete search history.

(56) References Cited

U.S. PATENT DOCUMENTS

| | | | |
|---|---|---|---|
| 6,842,332 B1 * | 1/2005 | Rubenson et al. | 361/679.09 |
| 6,922,333 B2 * | 7/2005 | Weng et al. | 361/679.2 |
| 8,017,879 B2 * | 9/2011 | Yang | 200/5 A |
| 8,248,278 B2 * | 8/2012 | Schlosser et al. | 341/27 |
| 2005/0168923 A1 * | 8/2005 | Huang et al. | 361/683 |
| 2010/0048258 A1 * | 2/2010 | Lu | 455/575.1 |

* cited by examiner

*Primary Examiner* — Zachary M Pape
*Assistant Examiner* — Douglas Burtner
(74) *Attorney, Agent, or Firm* — Morris Manning & Martin LLP; Tim Tingkang Xia, Esq.

(57) ABSTRACT

An input device fixing structure includes an input device and a housing case. The input device is disposed with at least one first magnetic component, and the housing case is disposed with at least one second magnetic component. The second magnetic component and the first magnetic component are adsorbed with each other through a magnetic force, so that the input device is fixed on the housing case.

7 Claims, 8 Drawing Sheets

INPUT DEVICE FIXING STRUCTURE

CROSS-REFERENCE TO RELATED APPLICATIONS

This non-provisional application claims priority under 35 U.S.C. §119(a) on Patent Application No(s). 099216402 filed in Taiwan, R.O.C. on Aug. 25, 2010, the entire contents of which are hereby incorporated by reference.

BACKGROUND OF THE INVENTION

1. Field of Invention

The present invention relates to an input device fixing structure, and more particularly to an input device fixing structure using a magnetic force adsorption manner.

2. Related Art

As a computer notebook develops until now, hardware structures thereof always develop towards an easy assembly. As for assembly of a keyboard, the conventional keyboard is locked by screws on a case body of the notebook computer. However, this method for assembling the keyboard on the case body always consumes too many assembly working hours. Generally speaking, in the prior art, a keyboard assembly procedure is that the keyboard is lifted and keeps a distance from a host; then a thin-film wire of the keyboard is inserted into a connector of the host, and the connector is covered; afterwards, hooks of the keyboard are aligned with corresponding grooves on the case body of the host, and the keyboard is assembled on the case body of the host; and finally, the keyboard is locked and fixed on the case body of the host through the screws.

Currently, an existing manner for fixing the keyboard mainly uses the screws to lock and fix the keyboard, and two screw locking directions exist, one is from the top of the case body of the host to the bottom, and the other is from the bottom of the case body of the host to the top, at this time, the case body of the host is required to be inverted to facilitate the assembly. However, no matter which locking manner is used, the common point is that the disassembly and the assembly are difficult and require long time. Especially, when the assembly of the notebook computer is completed, and it is found that a function of the keyboard is abnormal, a part of the housing case must be disassembled with great pains, so as to remove the screws to facilitate replacement of the keyboard. Moreover, during the process of removing the screws, the housing case may be scuffed or other inner components may be damaged, which causes decrease of quality and value. Furthermore, many electronic units exist in the notebook computer, for example, a hard disk, a Central Processing Unit (CPU), and various interface cards, and when the electronic units are required to be disassembled and assembled or maintained, the keyboard is also required to be disassembled. Therefore, the conventional keyboard assembly manner also adds inconvenience for the computer maintenance, and working hours are wasted.

Furthermore, when the screws are used to lock the keyboard, a locking force of each screw is not the same, and the locking force of the screw is a single-point stress. Therefore, when the keyboard is locked by the screws, uneven stress is usually inevitable, so that the keyboard is deformed, or even a central region of the keyboard floats. In order to solve the problem, high cost is required to enable the keyboard to be perfectly attached to the housing case, which increases the cost of the process.

SUMMARY OF THE INVENTION

Accordingly, the present invention is an input device fixing structure, so as to solve problems in the prior art that too many working hours are consumed for disassembling and assembling a key board, and screw locking results in an uneven stress on the keyboard, so that the key board cannot be perfectly attached to a housing case.

The present invention provides an input device fixing structure, which comprises a housing case, at least one first magnetic component, an input device, and at least one second magnetic component. The first magnetic component is fixed on the housing case. The second magnetic component is fixed on the input device and corresponds to the first magnetic component, and is adsorbed with the first magnetic component, so that the input device is fixed on the housing case through adsorption of a magnetic force.

According to the embodiments of the present invention, the input device fixing structure uses a principle of magnetic force adsorption, so that a large area of the input device is adsorbed on the housing case through the magnetic force. Therefore, an extra hook is not required to be designed for the input device to correspond to a groove of the housing case, and an automatic positioning effect may be easily achieved through the adsorption of the magnetic force. In this way, conventional complicated actions for locking screws are eliminated, time for assembly and disassembly in reworking is reduced, and the problem that a locking manner of single-point stress of the screws results in that the input device is deformed due to the uneven stress, and the input device cannot be perfectly attached to the housing case to generate floating is prevented.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
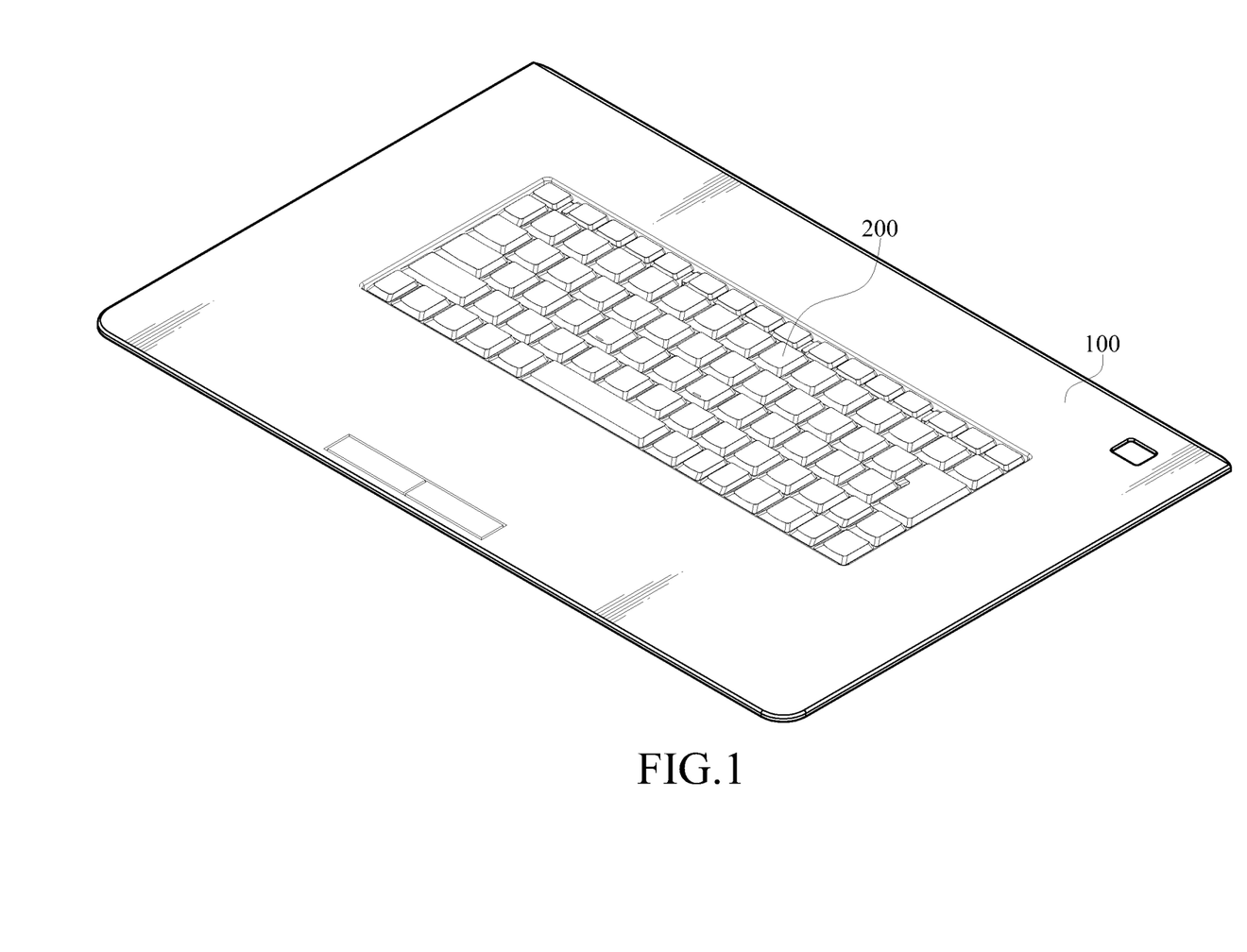
FIG. 1 is a schematic view of an input device assembled on a housing case according to an embodiment of the present invention.

Referring to FIG. 1, it is a schematic view of an input device assembled on a housing case according to an embodiment of the present invention. For ease of description, the input device of this embodiment takes a keyboard 200 as an example, but is not limited thereto, for example, the input device may also be a touch screen. According to an embodiment of the present invention, an input device fixing structure is used to enable a keyboard 200 to be quickly and conveniently assembled and fixed on a housing case 100, and enable the keyboard 200 to be perfectly attached to the housing case 100, so as to prevent a central region of the keyboard 200 from floating.

Figure 2A:
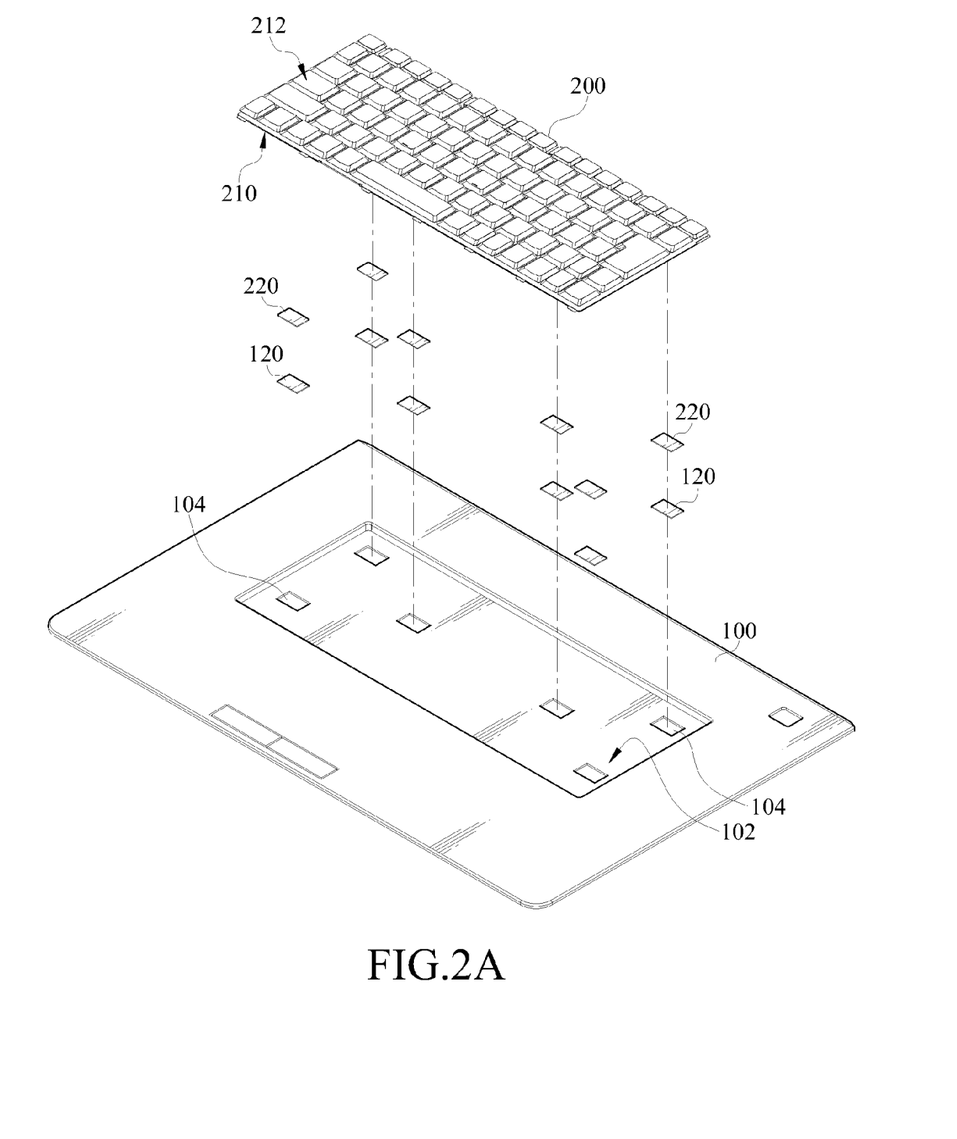
FIG. 2A is a schematic structural view of an input device fixing structure according to an embodiment of the present invention.
Figure 2B:
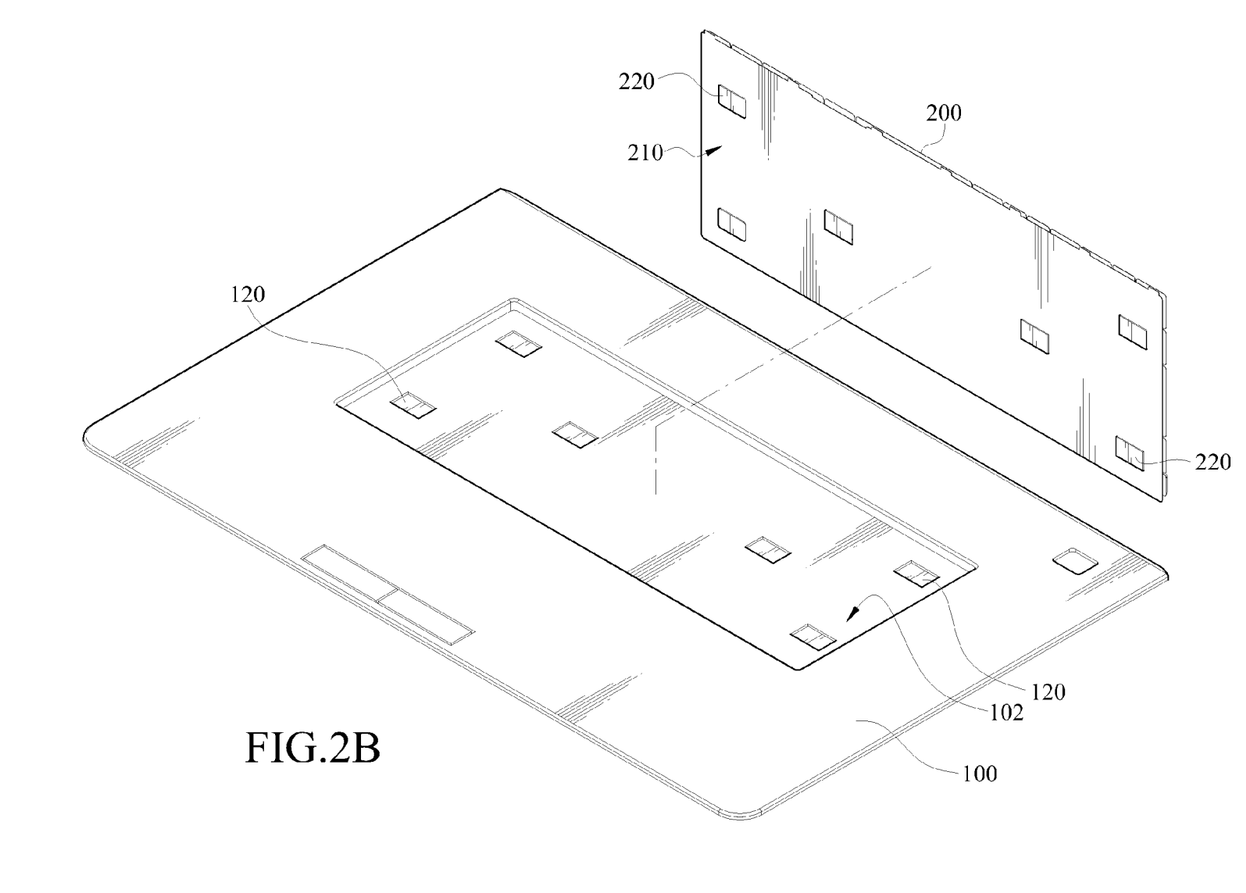
FIG. 2B is a schematic structural view of a holding unit disposed on the input device and the housing case according to FIG. 2A.

Referring to FIGS. 2A and 2B, FIG. 2A is a schematic structural view of an input device fixing structure according to an embodiment of the present invention, and FIG. 2B is a schematic structural view of magnetic components disposed on the input device and the housing case according to FIG. 2A. According to an embodiment of the present invention, a keyboard fixing structure comprises a housing case 100, six first magnetic components 120, six second magnetic components 220, and a keyboard 200. The first magnetic components 120 are fixed on the housing case 100, the second magnetic components 220 are fixed on the keyboard 200, and the first magnetic components 120 and the second magnetic components 220 are adsorbed with each other. It should be noted that, the number of the first magnetic components 120 and the number of the second magnetic components 220 are not intended to limit the present invention, for example, in another embodiment, the keyboard fixing structure may comprise eight first magnetic components 120 and eight second magnetic components 220, as long as the number of the first magnetic components 120 and the number of the second magnetic components 220 can match each other.

Furthermore, the housing case 100 further has a carrying groove 102, in which the carrying groove 102 is used to carry the keyboard 200. The carrying groove 102 further has six dimples 104 inside, and the six first magnetic components 120 are respectively embedded in the six dimples 104. It should be noted that the number of the dimples 104 is not intended to limit the present invention, as long as the number of the dimples 104 can correspond to the number of the first magnetic components 120. In this embodiment, the keyboard 200 further has an input surface 212 and a bottom surface 210 opposite to each other, and the input surface 212 has keycaps. The six second magnetic components 220 are fixed on the bottom surface 210, and are corresponding to the six first magnetic components 120. Furthermore, the second magnetic components 220 and the first magnetic components 120 are adsorbed with each other, so that the keyboard 200 can be fixed in the carrying groove 102 of the housing case 100 through an adsorption force between the second magnetic components 220 and the first magnetic components 120. When the second magnetic components 220 and the first magnetic components 120 are adsorbed with each other, the second magnetic components 220 are also snapped in the dimples 104, so that the keyboard 200 can have a constraint in a plane direction, so as to strengthen an effect of fixing the keyboard 200 on the housing case 100.

Furthermore, in this embodiment, the first magnetic component 120 and the second magnetic component 220 may respectively be a magnet, and magnetic properties are different when the magnets face each other, for example, an S-pole corresponds to an N-pole, or an N-pole corresponds to an S-pole. Furthermore, in an embodiment of the present invention, the first magnetic component 120 may be a magnet, and the second magnetic component 220 may be a ferromagnetic material (capable of being adsorbed by the magnet), through an adsorption characteristic of the magnet and the ferromagnetic material, the second magnetic component 220 and the first magnetic component 120 can be adsorbed with each other. Conversely, in an embodiment of the present invention, the first magnetic component 120 may also be a ferromagnetic material (capable of being adsorbed by the magnet), and the second magnetic component 220 may be a magnet, so that the matching type may still provide a mutual adsorption effect between the second magnetic component 220 and the first magnetic component 120.

In this embodiment, the input device fixing structure is fixed on the keyboard 200 through the second magnetic components 220, and the first magnetic components 120 are fixed on the housing case 100, so that the keyboard 200 can be adsorbed on the housing case 100 due to an influence that the magnet has a large area of adsorption force. Compared with the single-point stress manner of the conventional keyboard 200 locked by the screws, in an embodiment of the present invention, the keyboard fixing structure can enable the keyboard 200 to be stressed evenly to eliminate a deformation problem, and the keyboard 200 may be perfectly attached to the housing case 100, and a problem that poor quality is caused by floating of the conventional keyboard 200 on the housing case 100 is eliminated.

Figure 3:
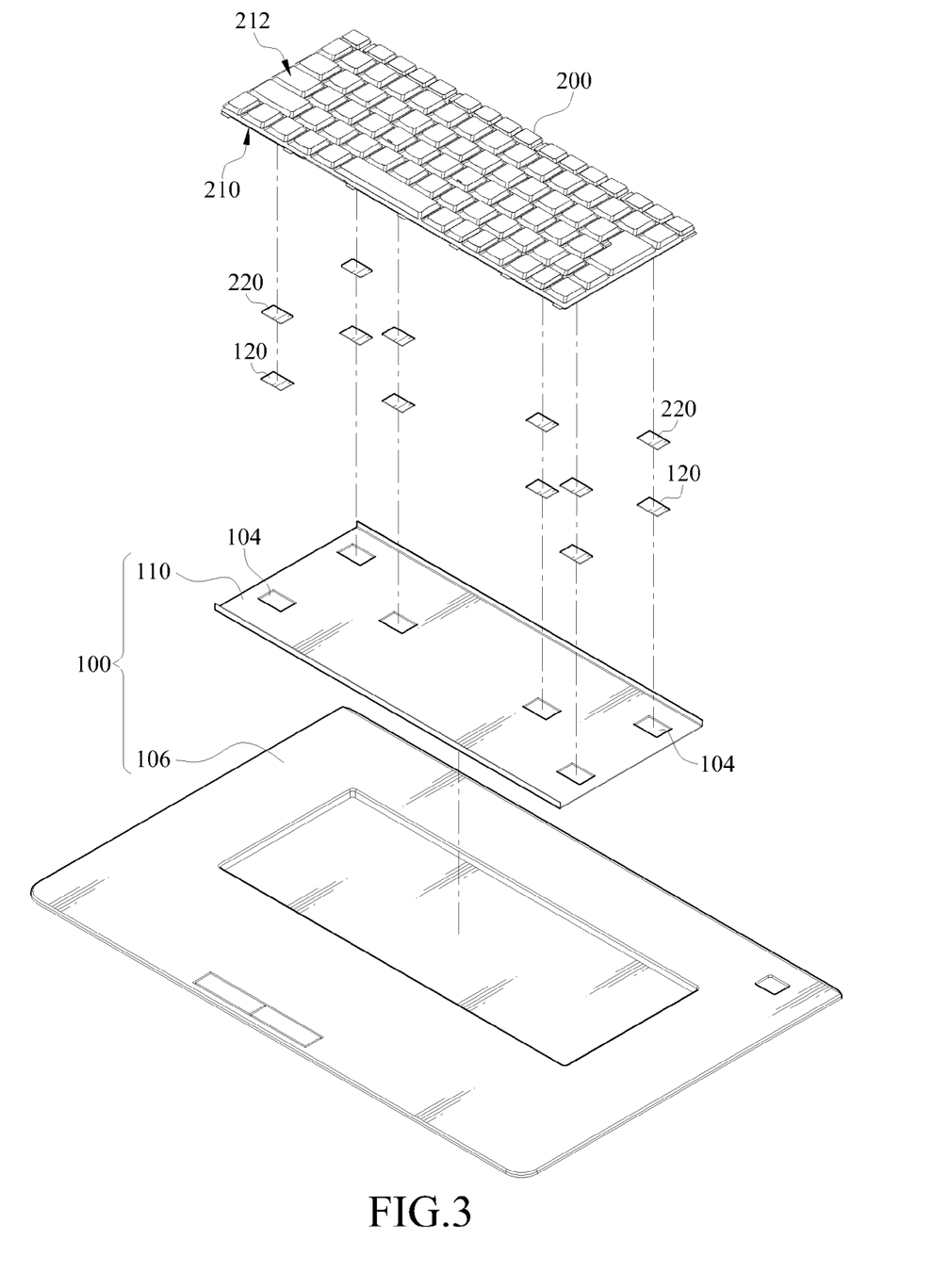
FIG. 3 is a schematic structural view of an input device fixing structure according to another embodiment of the present invention.

Referring to FIG. 3, it is a schematic structural view of an input device fixing structure according to another embodiment of the present invention. The structure of this embodiment is approximately the same as the above embodiment, so only differences are described. According to another embodiment of the present invention, the input device fixing structure comprises a housing case 100, six first magnetic components 120, six second magnetic components 220, and a keyboard 200. The housing case 100 further comprises a carrying plate 110 and a case body 106, in which the carrying plate 110 is fixed on the case body 106, and the carrying plate 110 is used to carry the keyboard 200. The first magnetic components 120 are fixed on the carrying plate 110, the second magnetic components 220 are fixed on the keyboard 200, and the first magnetic components 120 and the second magnetic components 220 are adsorbed with each other. It should be noted that, the number of the first magnetic components 120 and the number of the second magnetic components 220 are not intended to limit the present invention.

Furthermore, the carrying plate 110 further has six dimples 104, and the six first magnetic components 120 are respectively embedded in the six dimples 104. It should be noted that the number of the dimples 104 is not intended to limit the present invention, as long as the number of the dimples 104 can correspond to the number of the first magnetic components 120. The six second magnetic components 220 are fixed on the keyboard 200, and face the six first magnetic components 120. The second magnetic components 220 and the first magnetic components 120 are adsorbed with each other, so that the keyboard 200 can be disposed on the carrying plate 110 of the housing case 100 through an adsorption force between the second magnetic components 220 and the first magnetic components 120. Furthermore, in this embodiment, the first magnetic component 120 and the second magnetic component 220 may respectively be a magnet, and magnetic properties are different when the magnets face each other. Furthermore, in another embodiment of the present invention, the first magnetic component 120 may be a magnet, and the second magnetic component 220 may be a ferromagnetic material (capable of being adsorbed by the magnet); alternatively, the first magnetic component 120 may be a ferromagnetic material (capable of being adsorbed by the magnet), and the second magnetic component 220 may be a magnet.

Figure 4:
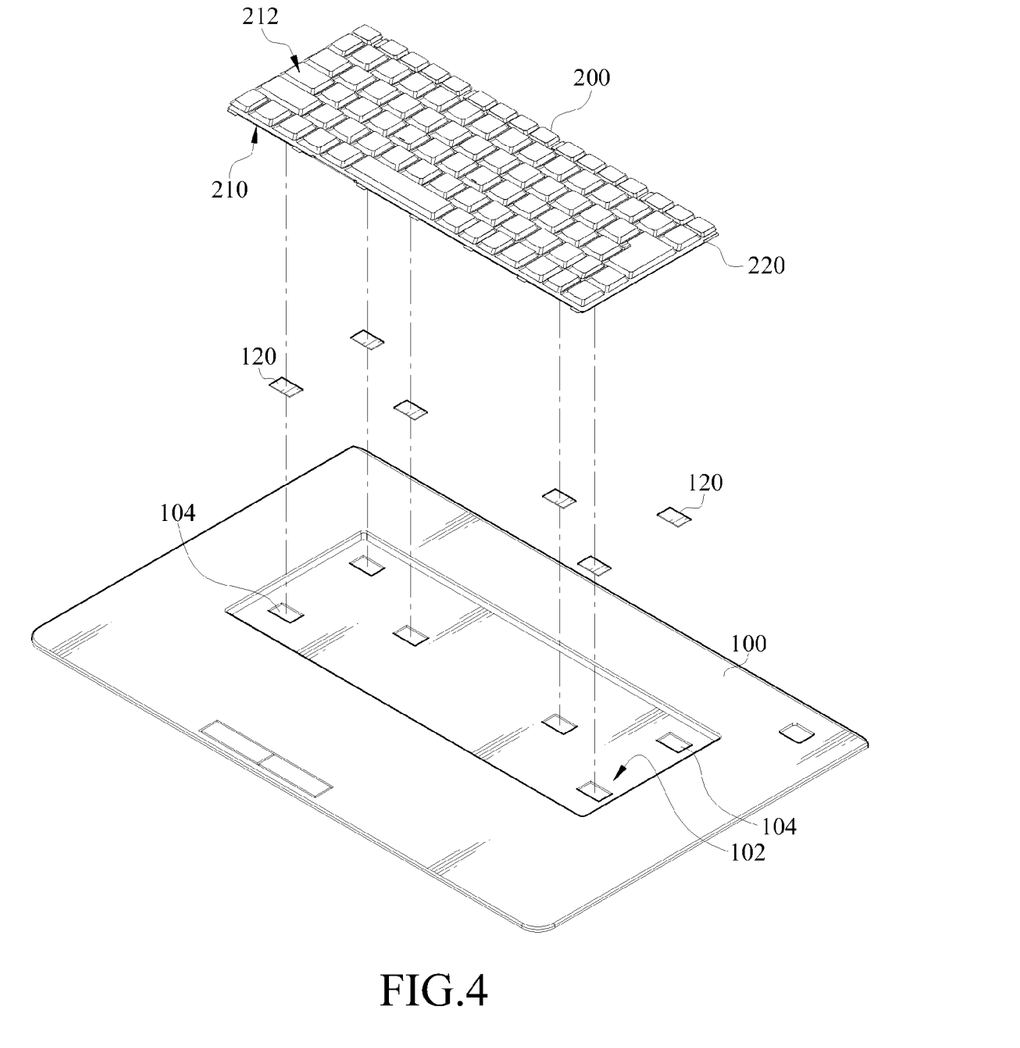
FIG. 4 is a schematic structural view of an input device fixing structure according to further another embodiment of the present invention.

Referring to FIG. 4, it is a schematic structural view of an input device fixing structure according to further another embodiment of the present invention. The structure of this embodiment is approximately the same as the embodiment of FIG. 2A, so only differences are described. According to further another embodiment of the present invention, the input device fixing structure comprises a housing case 100, six first magnetic components 120, a second magnetic component 220, and a keyboard 200. The housing case 100 further has a carrying groove 102 for carrying the keyboard 200. The carrying groove 102 further has six dimples 104 inside, and the six first magnetic components 120 are respectively embedded in the six dimples 104. The second magnetic component 220 is disposed on a bottom surface 210 of the keyboard 200, is a single flat body, and an appearance matches the bottom surface 210. The second magnetic component 220 and the keyboard 200 may be integrally formed, and the first magnetic components 120 and the second magnetic component 220 are adsorbed with each other. It should be noted that, the number of the second magnetic components 220 is not intended to limit the present invention.

Furthermore, in this embodiment, the first magnetic component 120 and the second magnetic component 220 may respectively be a magnet, and magnetic properties are different when the magnets face each other. Furthermore, in this embodiment, the first magnetic component 120 may be a magnet, and the second magnetic component 220 may be a ferromagnetic material (capable of being adsorbed by the magnet); alternatively, the first magnetic component 120 may be a ferromagnetic material (capable of being adsorbed by the magnet), and the second magnetic component 220 may be a magnet.

Figure 5:
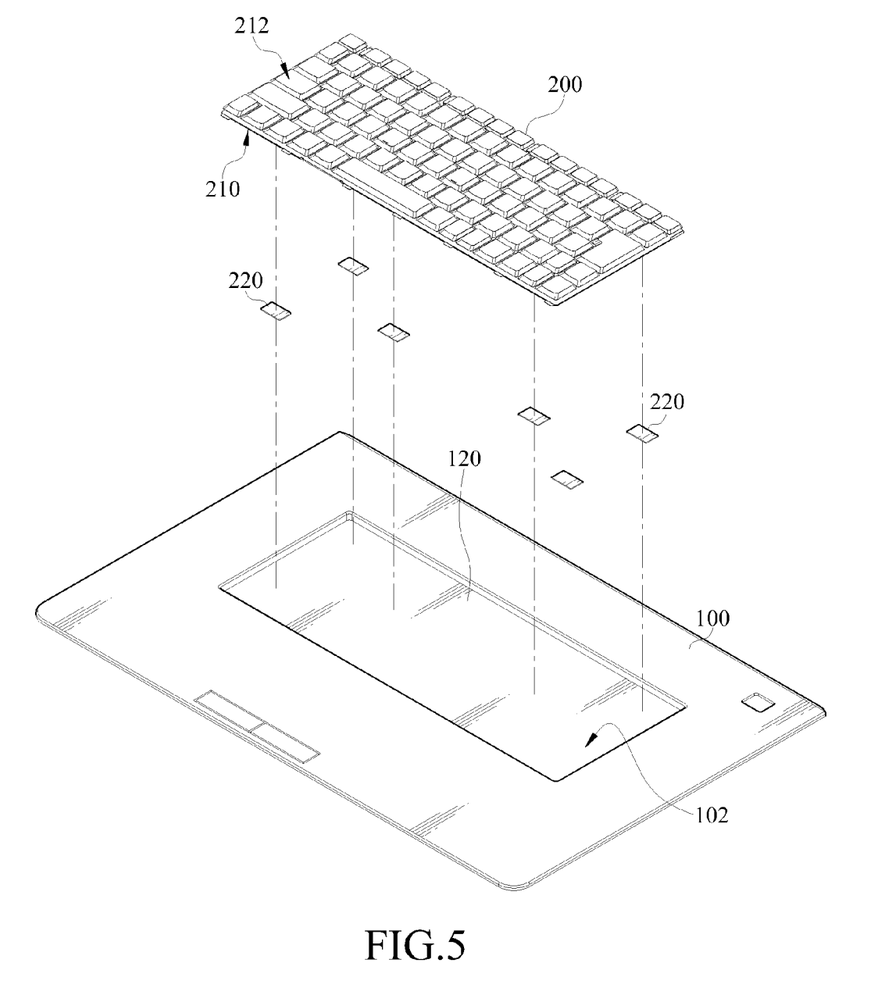
FIG. 5 is a schematic structural view of an input device fixing structure according to still another embodiment of the present invention.

Referring to FIG. 5, it is a schematic structural view of an input device fixing structure according to still another embodiment of the present invention. The structure of this embodiment is approximately the same as the embodiment of FIG. 2A, so only differences are described. According to still another embodiment of the present invention, the input device fixing structure comprises a housing case 100, a first magnetic component 120, six second magnetic components 220, and a keyboard 200. The housing case 100 further has a carrying groove 102 for carrying the keyboard 200. The first magnetic component 120 is disposed at a bottom of the carrying groove 102, and is a single flat body. The first magnetic component 120 and the carrying groove 102 may be integrally formed. The six second magnetic components 220 are fixed on a bottom surface 210 of the keyboard 200, and the first magnetic component 120 and the six second magnetic components 220 are adsorbed with each other. It should be noted that, the number of the first magnetic components 120 is not intended to limit the present invention.

Furthermore, in this embodiment, the first magnetic component 120 and the second magnetic component 220 may respectively be a magnet, and magnetic properties are different when the magnets face each other. Furthermore, in this embodiment, the first magnetic component 120 may be a magnet, and the second magnetic component 220 may be a ferromagnetic material (capable of being adsorbed by the magnet); alternatively, the first magnetic component 120 may be a ferromagnetic material (capable of being adsorbed by the magnet), and the second magnetic component 220 may be a magnet.

Figure 6:
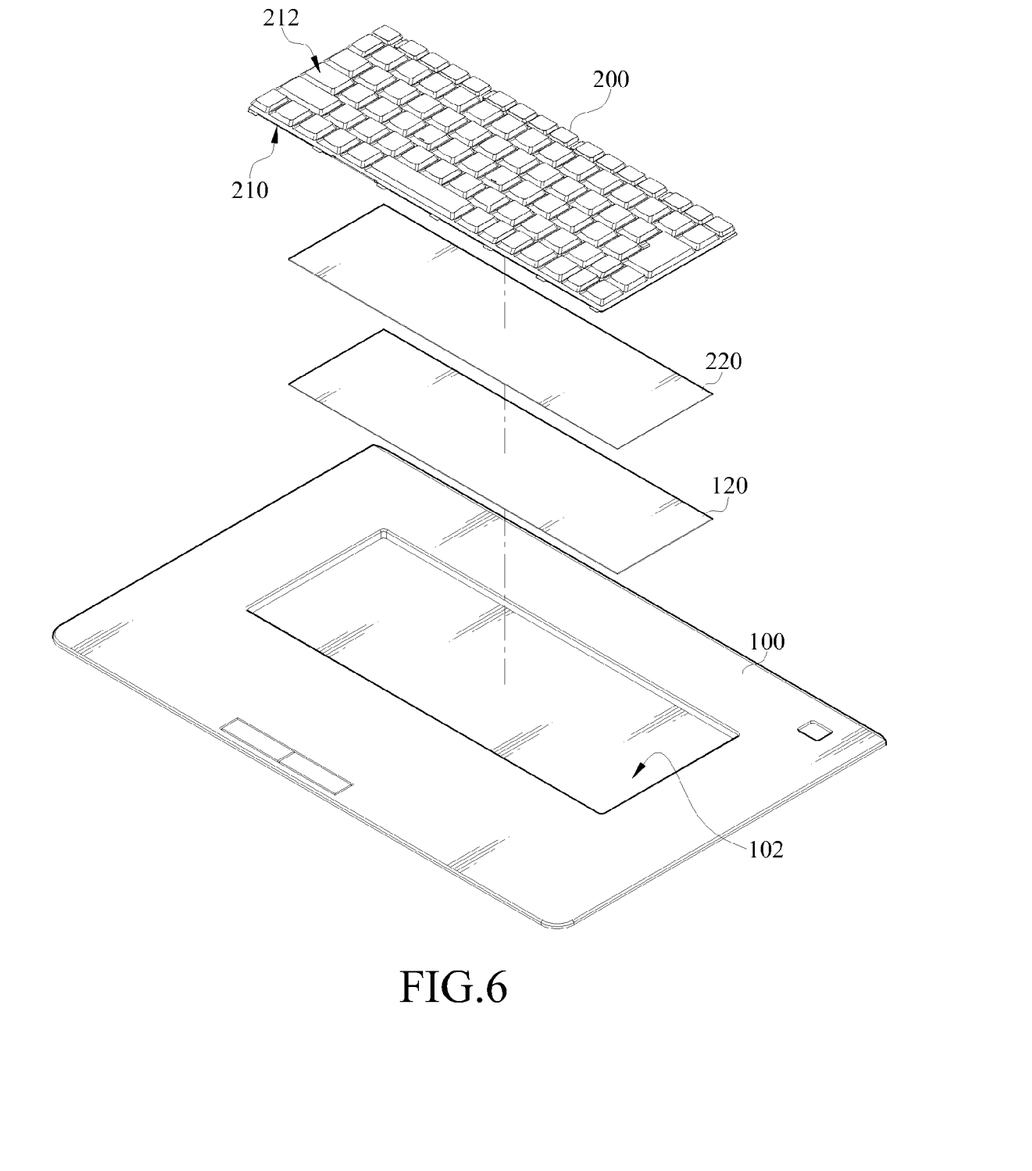
FIG. 6 is a schematic structural view of an input device fixing structure according to yet another embodiment of the present invention.

Referring to FIG. 6, it is a schematic structural view of an input device fixing structure according to yet another embodiment of the present invention. The structure of this embodiment is approximately the same as the embodiment of FIG. 2A, so only differences are described. According to yet another embodiment of the present invention, the input device fixing structure comprises a housing case 100, a first magnetic component 120, a second magnetic component 220, and a keyboard 200. The housing case 100 further has a carrying groove 102 for carrying the keyboard 200. The first magnetic component 120 is a single flat body, and is laid in the whole carrying groove 102. The second magnetic component 220 is also a single flat body, and fixed on a whole bottom surface 210 of the keyboard 200. The first magnetic component 120 and the second magnetic component 220 are adsorbed with each other, so that the bottom surface 210 of the keyboard 200 is wholly attached to the carrying groove 102 through the second magnetic component 220, and the keyboard 200 is perfectly attached to the housing case.

Furthermore, in this embodiment, the first magnetic component 120 and the second magnetic component 220 may respectively be a magnet, and magnetic properties are different when the magnets face each other. Furthermore, in this embodiment, the first magnetic component 120 may be a magnet, and the second magnetic component 220 may be a ferromagnetic material (capable of being adsorbed by the magnet); alternatively, the first magnetic component 120 may be a ferromagnetic material (capable of being adsorbed by the magnet), and the second magnetic component 220 may be a magnet.

Figure 7A:
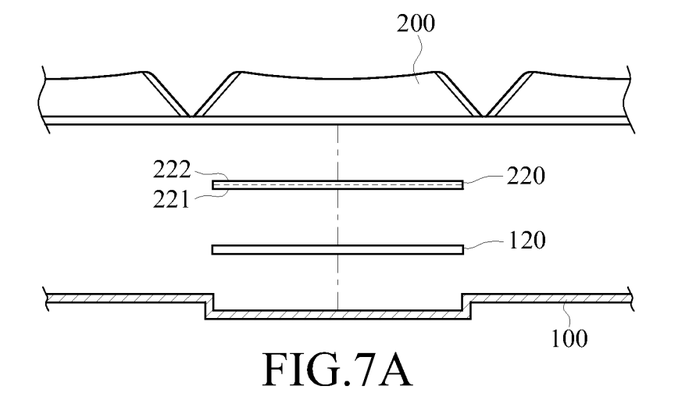
FIG. 7A is a structural sectional view of an input device fixing structure according to an embodiment of the present invention.

Furthermore, in order to reduce electronic interferences caused by magnetic properties on an electric element, in the present invention, the first magnetic component 120 or the second magnetic component 220 may further use the magnetic component only having a single-surface magnetic property. For example, as shown in FIG. 7A, the second magnetic component 220 has a second magnetic surface 221 and a second non-magnetic surface 222 opposite to each other. The second magnetic component 220 is attached to the keyboard 200 with the second non-magnetic surface 222, and the second magnetic surface 221 faces the first magnetic component 120. The first magnetic component 120 is disposed on the housing case 100, and the first magnetic component 120 is the ferromagnetic material (capable of being adsorbed by the magnet). The electronic interferences caused by the magnetic property on the electric element may be greatly reduced through the above disposition manner.

Figure 7B:
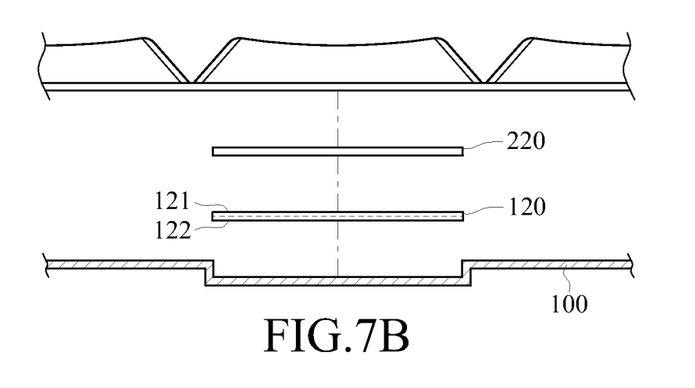
FIG. 7B is a structural sectional view of an input device fixing structure according to another embodiment of the present invention.

Alternatively, as shown in FIG. 7B, the first magnetic component 120 has a first magnetic surface 121 and a first non-magnetic surface 122 opposite to each other. The first magnetic component 120 is attached to the housing case 100 with the first non-magnetic surface 122, and the first magnetic surface 121 faces the second magnetic component 220. The second magnetic component 220 is disposed on the keyboard 200, and the second magnetic component 220 is the ferromagnetic material (capable of being adsorbed by the magnet). The electronic interferences caused by the magnetic property on the electric element may also be greatly reduced through the above disposition manner.

Figure 7C:
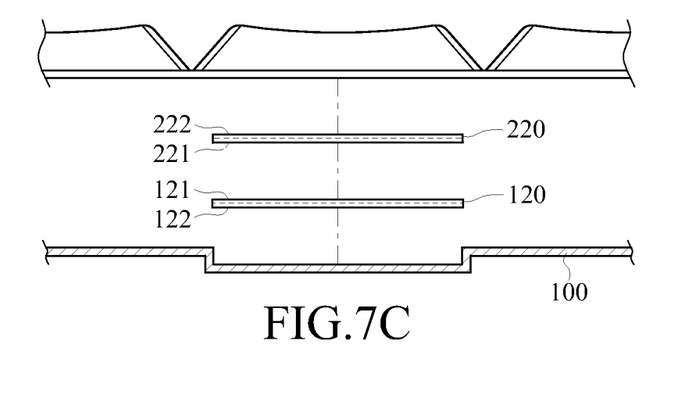
FIG. 7C is a structural sectional view of an input device fixing structure according to still another embodiment of the present invention.

Furthermore, as shown in FIG. 7C, the first magnetic component 120 has a first magnetic surface 121 and a first non-magnetic surface 122 opposite to each other, and the second magnetic component 220 has a second magnetic surface 221 and a second non-magnetic surface 222 opposite to each other. The first magnetic component 120 is attached to the housing case 100 with the first non-magnetic surface 122, the second magnetic component 220 is attached to the keyboard 200 with the second non-magnetic surface 222, and the first magnetic surface 121 faces the second magnetic surface 221. The electronic interferences caused by the magnetic property on the electric elements may also be greatly reduced through the above disposition manner.

In actual magnetism test, when a normal magnet is attached to the metal plate, there is still 252 gauss on the normal magnet. But when a magnetic component only having a single-surface magnetic property is attached to the metal plate, there is only 3 gauss on the magnetic component. So, we can understand that the electronic interferences caused by the magnetic property on the electric element may be greatly reduced via using the magnetic component only having a single-surface magnetic property.

According to the embodiments of the present invention, the keyboard fixing structure uses matching of a plurality of magnets having different magnetic properties, or matching of a plurality of magnets adsorbing a plurality of ferromagnetic materials to enable the keyboard to be fixed on the housing case through a principle of magnetic force adsorption. Therefore, an extra hook is not required to be designed to correspond to the groove of the housing case, and an automatic positioning effect may be easily achieved through an adsorption characteristic of the plurality of corresponding magnets having the different magnetic properties or the plurality of corresponding magnets and ferromagnetic materials. In this way, conventional complicated actions for locking the screws are eliminated, time for assembly and disassembly in reworking is reduced, and the appearance of the housing case or other inner constructions are prevented from being damaged when the screws are locked.

Moreover, in the present invention, the keyboard fixing structure uses an adsorption manner of the magnet with the surface to be stressed, rather than the locking manner of the screws with a point to be stressed, therefore, problems of deformation and floating of the keyboard caused by uneven stress on the keyboard due to screw locking are eliminated. Therefore, in the present invention, the keyboard fixing structure may enable the keyboard to be perfectly attached to the housing case, so as to further improve outgoing quality of a notebook computer.

Furthermore, in order to eliminate electromagnetic interferences of the magnetic property on the electronic element, in the present invention, the first magnetic component or the second magnetic component may further use the magnetic component only having the single-surface magnetic property, so as to greatly reduce the electromagnetic interferences and enable the present invention to be practically applicable to products.

What is claimed is:

1. An input device fixing structure comprising:
    a housing case;
    at least one first magnetic plate, fixed on the housing case, wherein the at least one first magnetic plate has a first magnetic surface and a first non-magnetic surface opposite to each other, the first non-magnetic surface faces the housing case and is attached to the housing case;
    a keyboard, comprising a bottom plate and a plurality of keycaps, wherein the bottom plate has a bottom surface and an input surface opposite to each other, the plurality of keycaps are disposed on the input surface, and the first magnetic surface faces the bottom plate; and
    at least one second magnetic plate, fixed on the bottom surface of the bottom plate of the keyboard and corresponding to the at least one first magnetic plate, wherein the at least one second magnetic plate is adsorbed and contacted with the first magnetic surface of the at least one first magnetic plate;
    wherein the at least one second magnetic plate is a magnet or a ferromagnetic material.

2. The input device fixing structure according to claim 1, wherein the housing case further comprises a case body and a carrying plate, the at least one first magnetic plate is fixed on the carrying plate, and the carrying plate is fixed on the housing case.

3. The input device fixing structure according to claim 1, comprising two or more first magnetic plates and two or more second magnetic plates, wherein the first magnetic plates are respectively corresponding to the second magnetic plates.

4. The input device fixing structure according to claim 1, comprising two or more first magnetic plates, wherein the first magnetic plates are corresponding to the second magnetic plate.

5. The input device fixing structure according to claim 1, comprising two or more second magnetic plates, wherein the first magnetic plate is corresponding to the second magnetic plates.

6. The input device fixing structure according to claim 1, wherein the at least one second magnetic plate comprises a second magnetic surface and a second non-magnetic surface opposite to each other, the second non-magnetic surface of the at least one second magnetic plate is attached to the bottom surface of the bottom plate of the keyboard, and the second magnetic surface of the at least one second magnetic plate is attached to the first magnetic surface of the at least one first magnetic.

7. An input device fixing structure comprising:
    a housing case;
    at least one first magnetic plate, fixed on the housing case;
    a keyboard, comprising a bottom plate and a plurality of keycaps, wherein the bottom plate has a bottom surface and an input surface opposite to each other, and the plurality of keycaps are disposed on the input surface; and
    at least one second magnetic plate, fixed on the bottom surface of the bottom plate of the keyboard and corresponding to the at least one first magnetic plate, wherein the second magnetic plate has a second magnetic surface and a second non-magnetic surface opposite to each other, the second magnetic surface faces the housing case, the second non-magnetic surface faces the bottom surface of the bottom plate, the second non-magnetic surface of the at least one second magnetic plate is attached to the bottom surface of the bottom plate of the keyboard, and the second magnetic surface of the at least one second magnetic plate is adsorbed and contacted with the at least one first magnetic plate;
    wherein the at least one first magnetic plate is a magnet or a ferromagnetic material.

* * * * *